United States Patent
Kuroda et al.

(10) Patent No.: US 6,967,827 B2
(45) Date of Patent: Nov. 22, 2005

(54) LAMINATED CAPACITOR

(75) Inventors: Yoichi Kuroda, Fukui (JP); Yoshio Kawaguchi, Fukui (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/983,514

(22) Filed: Nov. 8, 2004

(65) Prior Publication Data

US 2005/0105246 A1 May 19, 2005

(30) Foreign Application Priority Data

Nov. 14, 2003 (JP) ........................................ 2003-384740

(51) Int. Cl.[7] .......................... H01G 4/005; H01G 4/06
(52) U.S. Cl. ...................................... 361/303; 361/311
(58) Field of Search ............................. 361/303, 306.1, 361/306.2, 306.3, 307, 308.1, 308.2, 308.3, 309, 311–312

(56) References Cited

U.S. PATENT DOCUMENTS

| | | | | |
|---|---|---|---|---|
| 5,657,199 A | * | 8/1997 | Devoe et al. ............... | 361/328 |
| 6,727,782 B2 | * | 4/2004 | Sasaki et al. ............... | 333/185 |
| 6,795,294 B2 | * | 9/2004 | Kuroda et al. ............ | 361/306.1 |
| 2002/0171997 A1 | * | 11/2002 | Togashi et al. .......... | 361/308.1 |
| 2004/0207971 A1 | * | 10/2004 | Prymak et al. ........... | 361/306.3 |
| 2005/0047059 A1 | * | 3/2005 | Togashi .................... | 361/306.3 |
| 2005/0057886 A1 | * | 3/2005 | Mruz ....................... | 361/306.2 |

FOREIGN PATENT DOCUMENTS

| | | |
|---|---|---|
| JP | 60-149125 | 8/1985 |
| JP | 62-135427 | 6/1987 |
| JP | 05-055084 | 3/1993 |
| JP | 11-288839 | 10/1999 |
| JP | 2000-243657 | 9/2000 |
| JP | 2003-178933 | 6/2003 |

* cited by examiner

*Primary Examiner*—Eric W. Thomas
(74) *Attorney, Agent, or Firm*—Keating & Bennett, LLP

(57) ABSTRACT

A laminated capacitor includes a first capacitor element having a capacitance component provided by capacitance forming portions, facing each other, and an inductance component provided by the current pass between lead-out portions, a second capacitance element having a capacitance component provided by terminal electrodes, facing each other, and an inductance component provided by the current pass between the terminal electrodes, and a third capacitance element having a capacitance component provided by a set of the pluralities of capacitance forming portions facing the terminal electrodes and an inductance component provided by the current pass around the capacitance forming portions. Very good pass characteristics are obtained by the combination of the first to third capacitor elements.

38 Claims, 19 Drawing Sheets

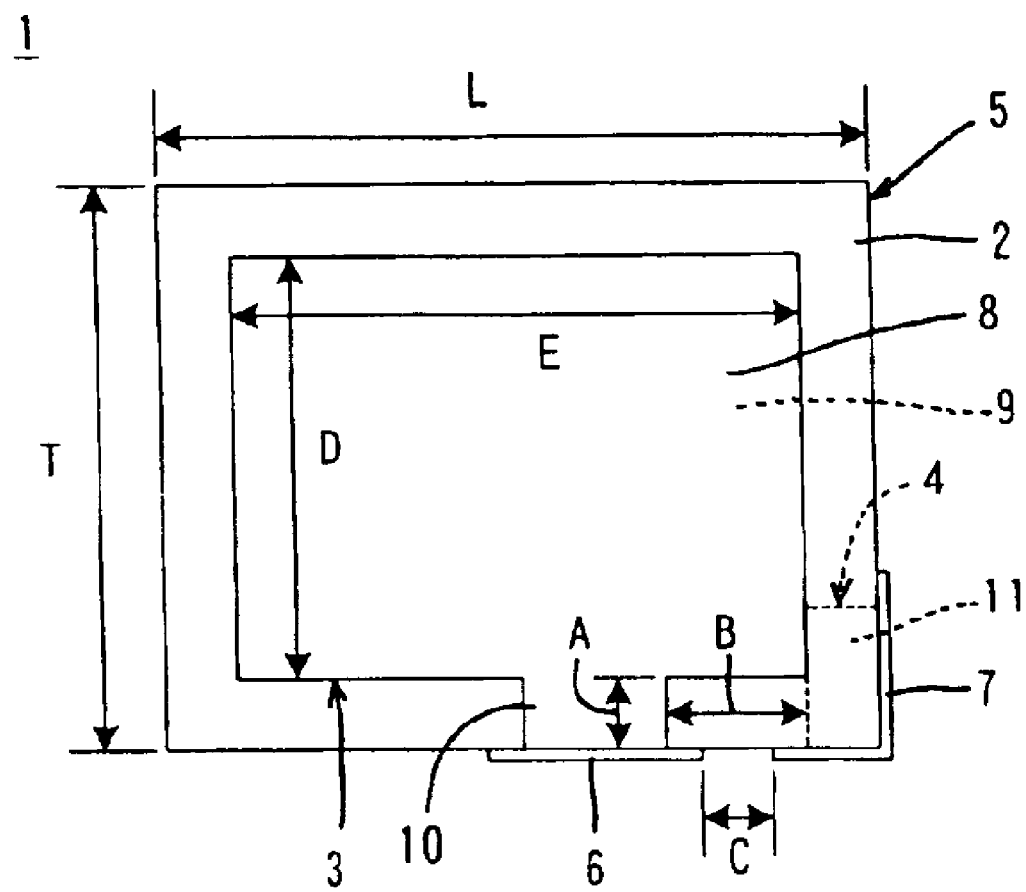

LAMINATED CAPACITOR

BACKGROUND OF THE INVENTION

1. Field of the Invention

The present invention relates to a laminated capacitor and more particularly to a laminated capacitor that is applicable to a high-frequency circuit.

2. Description of the Related Art

The frequency characteristics of a laminated capacitor are determined by its capacitance and inductance components, but generally, it is difficult to realize uniform and good pass characteristics over a wide frequency range.

In FIG. 19, one example of frequency characteristics of a laminated capacitor is shown. The laminated capacitor having the frequency characteristics shown in FIG. 19 has a planar dimension of 1.0 mm×0.5 mm and is a laminated ceramic capacitor having a capacitance of 220 nF that is currently available in the market.

As is understood from FIG. 19, generally, laminated capacitors commonly used have a tendency that the inductance component increases and the pass characteristics (S21 in S parameters) are worsened in the vicinity of 10 GHz and in the frequency range and higher.

On the other hand, for example, in Japanese Unexamined Patent Application Publication NG 2000-243657, a laminated capacitor in which the pass characteristics are attempted to be widened is proposed. This laminated capacitor is favorably used as a capacitor for cutting off DC components in the field of high-speed optical communications and is characterized by the combination of a low capacitance portion and a high capacitance portion.

However, in the laminated capacitor described in Japanese Unexamined Patent Application Publication No. 2000-243657, the pass characteristics are widened to 20 GHz at most and a higher frequency range, for example, a high-frequency range up to 40 GHz cannot be appropriately dealt with.

SUMMARY OF THE INVENTION

In order to overcome the problems described above, preferred embodiments of the present invention provide a laminated capacitor having very good pass characteristics, for example, from a low frequency of 10 kHz to a high frequency of 40 GHz.

A laminated capacitor according to a preferred embodiment of the present invention includes a composite capacitor having at least first, second, and third capacitor elements, a capacitor main body having a laminated structure including a plurality of laminated dielectric layers and pluralities of first and second internal electrodes disposed along a plurality of interfaces between the dielectric layers, the first and second internal electrodes alternately disposed in the lamination direction, first and second terminal electrodes disposed on the external surface of the capacitor main body, and first and second capacitance forming portions facing each other through a dielectric layer and first and second lead-out portions led out from the first and second capacitance forming portions and connected to the first and second terminal electrodes, contained by the first and second internal electrodes, respectively.

The first capacitor element includes a first capacitance component and a first inductance component, the first capacitance component is formed by the first and second capacitance forming portions facing each other, the first inductance component is mainly formed by the current pass between the first and second lead-out portions in the first and second internal electrodes in the frequency range of up to about 10 GHz, and the pass characteristics in the frequency range of up to about 10 GHz are formed by the first capacitance component and the first inductance component.

The second capacitor element includes a second capacitance component and a second inductance component, the second capacitance component is formed by the first and second terminal electrodes facing each other, the second inductance component is mainly formed by the current pass between the first and second terminal electrodes in the frequency range of about 15 GHz to about 20 GHz, and the pass characteristics in the frequency range of about 15 GHz to about 20 GHz are formed by the second capacitance component and the second inductance component.

The third capacitor element includes a third capacitance component and a third inductance component, the third capacitance component is formed by a set of the pluralities of first and second capacitance forming portions and the first and second terminal electrodes facing each other, the third inductance component is mainly formed by the current pass around the first and second capacitance forming portions in the frequency range of not less than about 30 GHz, and the pass characteristics in the frequency range of not less than about 30 GHz are formed by the third capacitance component and the third inductance component.

The first inductance component has an inductance value of not more than about 500 pH at about 10 GHz and is larger than both of the inductance value of the second inductance component at about 15 GHz to about 20 GHz and the inductance value of the third inductance component at about 30 GHz.

In the above-described structure, preferably, the distance between the first and second terminal electrodes is not more than about 300 $\mu$m.

In the above-described structure, preferably, in the pass band, the first and second inductance components function in the frequency range of about 10 GHz to about 15 GHz, and the second and third inductance components function in the frequency range of about 20 GHz to about 30 GHz.

Furthermore, a laminated capacitor according to a preferred embodiment of the present invention includes a composite capacitor including at least first, second, and third capacitor elements, a capacitor main body having a laminated structure including a plurality of laminated dielectric layers and pluralities of first and second internal electrodes disposed along a plurality of interfaces between the dielectric layers, the first and second internal electrodes alternately disposed in the lamination direction, first and second terminal electrodes disposed on the external surface of the capacitor main body, and first and second capacitance forming portions facing each other through a dielectric layer and first and second lead-out portions led out from the first and second capacitance forming portions and connected to the first and second terminal electrodes, contained by the first and second internal electrodes, respectively.

The first capacitor element includes a first capacitance component and a first inductance component, the first capacitance component is formed by the first and second capacitance forming portions facing each other, the first inductance component is mainly formed by the current pass between the first and second lead-out portions in the first and second internal electrodes in the frequency range of up to about 10 GHz, and the pass characteristics in the frequency range of up to about 10 GHz are formed by the first capacitance component and the first inductance component.

The second capacitor element includes a second capacitance component and a second inductance component, the second capacitance component is formed by the first and second terminal electrodes facing each other, the second inductance component is mainly formed by the current pass between the first and second terminal electrodes in the frequency range of about 15 GHz to about 20 GHz, and the pass characteristics in the frequency range of about 15 GHz to about 20 GHz are formed by the second capacitance component and the second inductance component.

The third capacitor element includes a third capacitance component and a third inductance component, the third capacitance component is formed by a set of the pluralities of first and second capacitance forming portions and the first and second terminal electrodes facing each other, the third inductance component is mainly formed by the current pass around the first and second capacitance forming portions in the frequency range of not less than about 30 GHz, and the pass characteristics in the frequency range of not less than about 30 GHz are formed by the third capacitance component and the third inductance component.

The distance between the first and second terminal electrodes is not more than about 300 μm.

In the above-described structure, preferably, in the pass band, the first and second inductance components function in the frequency range of about 10 GHz to about 15 GHz, and the second and third inductance components function in the frequency range of about 20 GHz to about 30 GHz.

Furthermore, a laminated capacitor according to a preferred embodiment of the present invention includes a composite capacitor including at least first, second, and third capacitor elements, a capacitor main body having a laminated structure including a plurality of laminated dielectric layers and pluralities of first and second internal electrodes disposed along a plurality of interfaces between the dielectric layers, the first and second internal electrodes alternately disposed in the lamination direction, first and second terminal electrodes disposed on the external surface of the capacitor main body, and first and second capacitance forming portions facing each other through a dielectric layer and first and second lead-out portions led out from the first and second capacitance forming portions and connected to the first and second terminal electrodes, contained by the first and second internal electrodes, respectively.

The first capacitor element includes a first capacitance component and a first inductance component, the first capacitance component is formed by the first and second capacitance forming portions facing each other, the first inductance component is mainly formed by the current pass between the first and second lead-out portions in the first and second internal electrodes in the frequency range of up to about 10 GHz, and the pass characteristics in the frequency range of up to about 10 GHz are formed by the first capacitance component and the first inductance component.

The second capacitor element includes a second capacitance component and a second inductance component, the second capacitance component is formed by the first and second terminal electrodes facing each other, the second inductance component is mainly formed by the current pass between the first and second terminal electrodes in the frequency range of about 15 GHz to about 20 GHz, and the pass characteristics in the frequency range of about 15 GHz to about 20 GHz are formed by the second capacitance component and the second inductance component.

The third capacitor element includes a third capacitance component and a third inductance component, the third capacitance component is formed by a set of the pluralities of first and second capacitance forming portions and the first and second terminal electrodes facing each other, the third inductance component is mainly formed by the current pass around the first and second capacitance forming portions in the frequency range of not less than about 30 GHz, and the pass characteristics in the frequency range of not less than about 30 GHz are formed by the third capacitance component and the third inductance component.

The pass band is formed by the combination of the first to third pass characteristics, the pass characteristics are not less than about −0.5 dB in the frequency range of up to about 15 GHz, and the pass characteristics are not less than about −1.0 dB in the frequency range of not lower than about 15 GHz.

In the above-described structure, preferably, the first inductance component has an inductance value of not more than about 500 pH at about 10 GHz and is larger than both of the inductance value of the second inductance component in about 15 GHz to about 20 GHz and the inductance value of the third inductance component at about 30 GHz.

In the above-described structure, preferably, the distance between the first and second terminal electrodes is not more than about 300 μm.

In the above-described structure, preferably, in the pass band, the first and second inductance components function in the frequency range of about 10 GHz to about 15 GHz, and the second and third inductance components function in the frequency range of about 20 GHz to about 30 GHz.

According to various preferred embodiments of the present invention, a composite capacitor includes at least first, second, and third capacitor elements. Then, the capacitor elements which function in accordance with frequency ranges can be changed such that, in a relatively low frequency range, the first capacitor element functions; in a frequency range higher than that, the second capacitor element functions; and in a much higher frequency range, the third capacitor element functions. As a result, continuous pass characteristics over a wide frequency range can be realized by the combination of the first, second, and third capacitor elements.

For example, in the frequency range of up to about 0.1 GHz, the insertion loss is reduced by increasing the first capacitance component provided by the first capacitor element; in the frequency range of about 0.1 GHz to about 10 GHz, the insertion loss is reduced by shortening the current pass between the first and second lead-out portions as the first inductance component provided by the first capacitor element; in the frequency range of about 15 GHz to about 20 GHz, the insertion loss is reduced by shortening the current pass between the first and second terminal electrodes as the second inductance component provided by the second capacitance element; and in the frequency range of not less than about 30 GHz, the insertion loss can be reduced by shortening the current pass around the first and second capacitance forming portions as the third inductance component provided by the third capacitor element.

Therefore, in a laminated capacitor according to various preferred embodiments of the present invention, as described above, very good pass characteristics can be obtained over a wide frequency range such that, for example, in the frequency range of up to about 10 GHz, the first capacitance component and the second inductance function; in the frequency range of about 10 GHz to about 15 GHz, the first and second inductance components function; in the frequency range of about 20 GHz to about 30 GHz, the second and third inductance components function;

and in the frequency range of not less than about 30 GHz, the third inductance component functions.

Other features, elements, characteristics and advantages of the present invention will become more apparent from the following detailed description of preferred embodiments with reference to the attached drawings.

BRIEF DESCRIPTION OF THE DRAWINGS

FIG. 1 is a front view of a laminated capacitor according to a first preferred embodiment of the present invention, when seen through the inside of the laminated capacitor;

DETAILED DESCRIPTION OF PREFERRED EMBODIMENTS

Figure 2A:
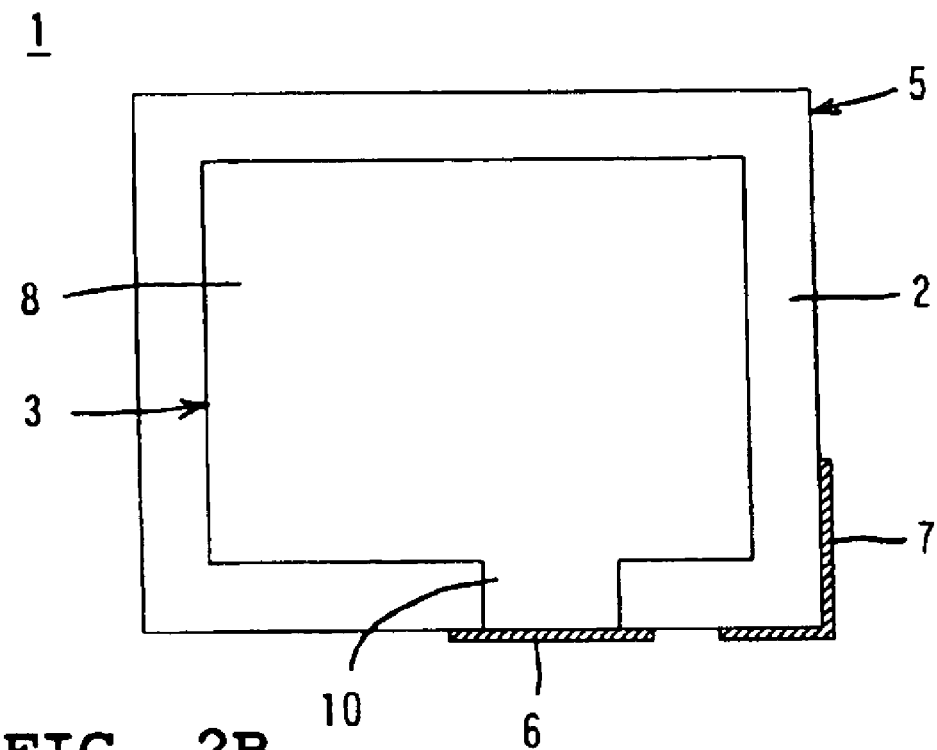
FIGS. 2A and 2B are front views showing different specific cut planes of the laminated capacitor shown in FIG. 1.
Figure 2B:
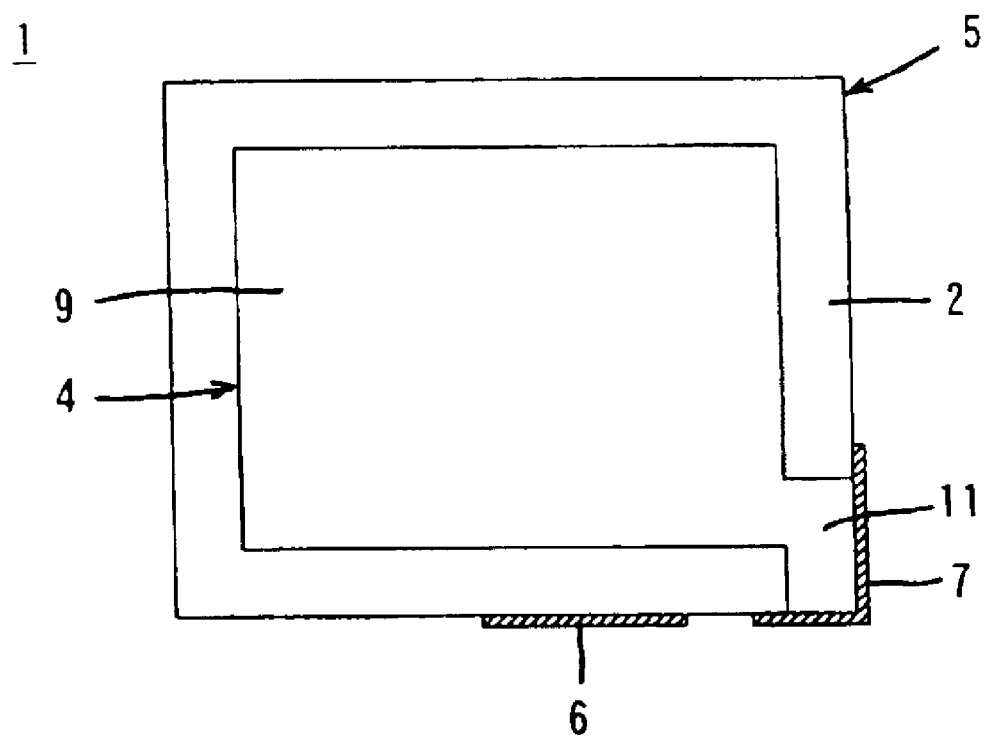
Figure 3:
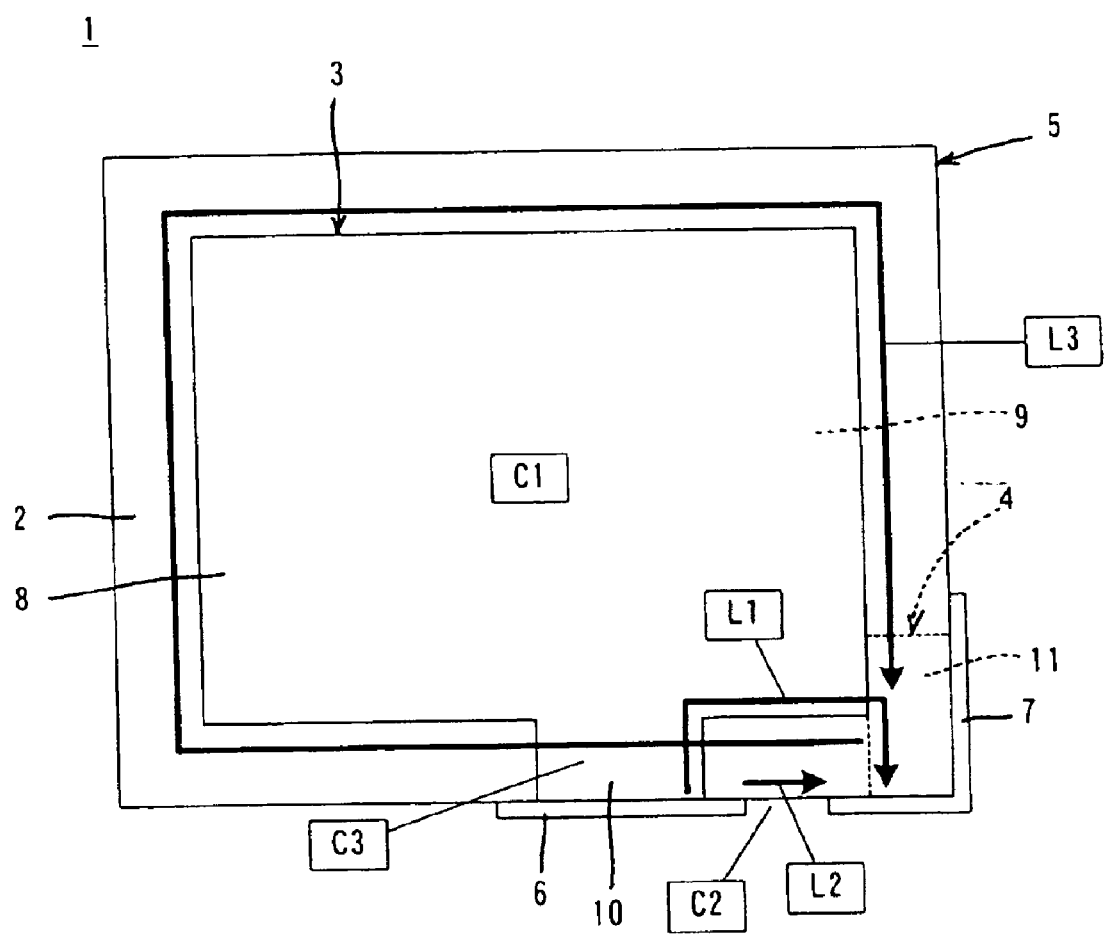
FIG. 3 is an expanded view of FIG. 1 to describe the laminated capacitor constructed as a composite capacitor.

FIGS. 1 to 3 describe a laminated capacitor 1 according to a preferred embodiment of the present invention. FIG. 1 is a front view of the laminated capacitor 1, when seen through the inside of the laminated capacitor 1, and FIGS. 2A and 2B are front views showing specific cut planes of the laminated capacitor 1. FIG. 3 is an expanded view of FIG. 1 to describe the laminated capacitor 1 constructed as a composite capacitor.

With reference to FIGS. 1, 2A, and 2B, the laminated capacitor 1 is provided with a capacitor main body 5 having a laminated structure in which, for example, a plurality of laminated dielectric layers 2 made of dielectric ceramics, and pluralities of first and second internal electrodes 3 and 4 disposed along a plurality of interfaces between the dielectric layers and alternately disposed in the lamination direction are provided.

The laminated capacitor 1 is also provided with a first terminal electrode 6 and a second terminal electrode 7 on the external surface of the capacitor main body 5.

As is understood from the fact that a first internal electrode 4. 2A and a second internal electrode 4 is shown in FIG. 2B, FIG. 2A shows a section passing through the first internal electrode 3 and FIG. 2B shows a section passing through the second internal electrode 4.

The first and second internal electrodes 3 and 4 are provided with first and second capacitance forming portions 8 and 9 facing each other through a dielectric layer 2 and first and second lead-out portions 10 and 11 led out from the first and second capacitance forming portions 8 and 9 and connected to the first and second terminal electrodes 6 and 7.

The laminated capacitor 1 having the above-described structure is constructed as a composite capacitor including at least first, second, and third capacitor elements.

With reference to FIG. 3, the first capacitor element includes a first capacitance component C1 provided by the first and second capacitance forming portions 8 and 9 facing each other, and a first inductance component L1 as an equivalent series 10 and 11 in the first and second internal electrodes 3 and 4, that is, the current pass from one lead-out portion 10 or 11 to the other lead-out portion 11 or 10 through a part of the capacitance forming portion 8 or 9.

The second capacitor element includes a second capacitance component C2 provided by the first and second terminal electrodes 6 and 7 facing each other, and a second inductance component L2 as an equivalent series inductance provided by the current pass between the first and second terminal electrodes 6 and 7, that is, the current pass from one terminal electrode 6 or 7 to the other terminal electrode 7 or 6 through a part of the dielectric layer 2.

The third capacitor element includes a third capacitance C3 provided by a set of first and second capacitance forming portions 8 and 9 and the first terminal electrode 6 facing each other, and by the set of first and second capacitance forming portions 8 and 9 and the second terminal electrode 7 facing each other. The third capacitor element also includes a third inductance component L3 as an equivalent series inductance provided by the current pass around the first and second capacitance forming portions 8 and 9.

The above-described first to third capacitor elements are different in terms of the frequency ranges within which they function. That is, in a relatively low frequency range, the first capacitor element functions; in a frequency range higher than that, the second capacitor element functions; and in a much higher frequency range, the third capacitor element functions. Then, at least one of the first to third capacitance components C1 to C3 and the first to third inductance components L1 to L3 constitutes the pass band of the laminated capacitor 1.

As a result, the laminated capacitor 1 achieves very good pass characteristics over a wide frequency range by combination of the first, second, and third capacitor elements.

First Preferred Embodiment

As the first preferred embodiment of the present invention, the laminated capacitor 1 as shown in FIG. 1 was produced, based on the following design.

First of all, as a dielectric material constituting the dielectric layer 2, a dielectric ceramic having a relative dielectric constant of about 2500 is preferably used and the dielectric layer 2 is preferably set to be about 3 μm in thickness, for example. Furthermore, the total number of laminations of the first and second internal electrodes 3 and 4 is preferably 75 to make a laminated capacitor 1 of about 220 nF, for example.

Furthermore, with reference to FIG. 1, regarding the dimension of each portion of the laminated capacitor 1, the dimension L in the length direction of the capacitor main body 5 is preferably about 1.0 mm and the dimension T in the thickness direction is preferably about 0.8 mm, for example. The dimension in the width direction perpendicular to the plane of FIG. 1 is preferably about 0.5 mm, for example.

Furthermore, the length A of the lead-out portions 10 and 11 is preferably about 0.1 mm, the distance B between the lead-out portions 10 and 11 is preferably about 0.2 mm, the distance C between the terminal electrodes 6 and 7 is preferably about 0.1 mm, the length D in the direction perpendicular to the capacitance forming portions 8 and 9 is preferably about 0.6 mm, and the length E in the horizontal direction of the capacitance forming portions 8 and 9 is preferably about 0.8 mm, for example.

The pass characteristics (insertion loss) S21 up to about 35 GHz of the laminated capacitor 1 which is designed and produced as described above, is shown in FIG. 4.

In the frequency range of up to about 10 GHz, the current flows through the capacitance forming portions 8 and 9 which have low impedance. Furthermore, the current at this time flows so that the distance between the first and second lead-out portions 10 and 11 may be the shortest. As a result, the first capacitance element, which includes a first capacitance component C1 provided by the first and second capacitance forming portions 8 and 9 facing each other and a first inductance component L1 provided by the current pass between the first and second lead-out portions 10 and 11, functions.

Figure 4:
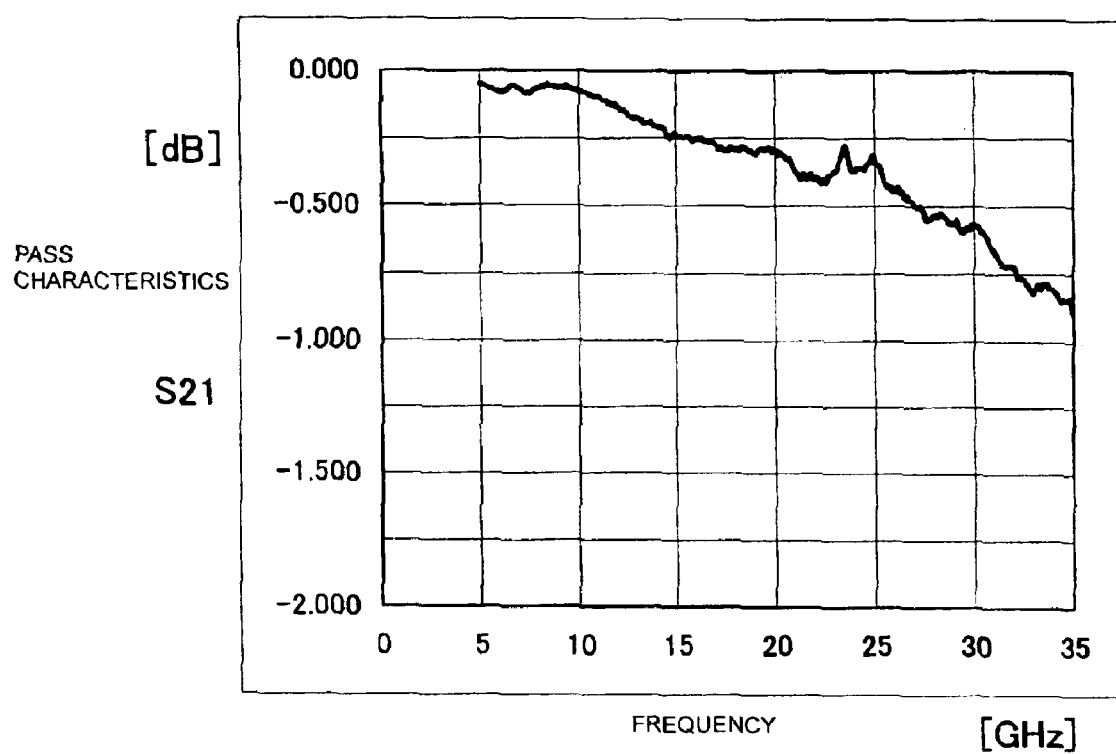
FIG. 4 shows the pass characteristics obtained in the laminated capacitor according to the first preferred embodiment which is specifically designed and produced.

In the laminated capacitor 1 according to the first preferred embodiment, the first capacitance component C1 is preferably about 220 nF and the first inductance component L1 is preferably about 250 pH, for example. The resonance frequency of the first capacitance component C1 and the first inductance component L1 is preferably about 21 MHz and S21 in about 5 GHz to about 10 GHz in the pass characteristics shown in FIG. 4 is decided by the equivalent series inductance value of about 250 pH provided by the first inductance component L1.

Next, in the frequency range of not less than about 10 GHz, since the impedance increases because of the first inductance component L1 of the first capacitor element, the current starts to flow between the first and second terminal electrodes 6 and 7 where the impedance is lower. Here, in the frequency range of about 15 GHz to about 20 GHz, the second capacitor element, which has the second capacitance component C2 provided by the first and second terminal electrodes 6 and 7 facing each other and the second inductance component L2 provided by the current pass between the first and second terminal electrodes 6 and 7, functions.

In the laminated capacitor 1 according to the first preferred embodiment, the second capacitance component C2 is preferably about 11 pF and the second inductance component L2 is preferably about 200 pH, for example. Accordingly, the resonance frequency of the second capacitance component C2 and the second inductance component L2 is about 3.4 GHz and S21 in the frequency range of about 15 to about 20 GHz depends on the equivalent series inductance value of about 200 pH provided by the second inductance component L2.

Next, in the frequency range of not less than about 20 GHz, since the impedance between the first and second terminal electrodes 6 and 7 goes high, the current starts to flow at the edge of the first and second capacitance forming portions 8 and 9 and through the dielectric of its vicinity.

When the frequency exceeds about 30 GHz in particular, the set of first and second capacitance forming portions 8 and 9 acts as a virtual block of metal and the current flows on a portion of the surface of the first and second capacitance forming portions 8 and 9 acting as the virtual block of metal because of the skin effect, and, as a result, the third capacitor element, which has a third capacitance component C3 and a third inductance component L3 functions.

In the laminated capacitor 1 according to the first preferred embodiment, the third capacitance component C3 is preferably about 40 pF and the third inductance component L3 is preferably about 230 pH, for example. The resonance frequency of the third capacitance component C3 and the third inductance component L3 is preferably about 1.6 GHz and S21 in the frequency range of not less than about 30 GHz shown in FIG. 4 and is determined by the equivalent series inductance value of about 230 pH provided by the third inductance component L3.

In order to make the insertion loss S21 flat and small over a wide frequency range, it is preferable to make the inductance value of each of the first, second, and third inductance components L1, L2, and L3 small and make the inductance value close to each other.

In the case of the above-described first preferred embodiment, the value of the first inductance component L1 is made small by shortening the current pass between the first and second lead-out portions 10 and 11, the value of the second inductance component L2 is made small by shortening the current pass between the first and second terminal electrodes 6 and 7, and the value of the third inductance component L3 is made small by shortening the distance around the capacitance forming portions 8 and 9 and, as a result, shortening the current pass around the capacitance forming portions 8 and 9.

The first preferred embodiment having the structure shown in FIG. 1 and the pass characteristics in FIG. 4 is based on a design that is within the scope of the present invention. Hereinafter, a few other preferred embodiments which are based on the present invention and changed in various ways in design, that is, the second to eighth preferred embodiments of the present invention are described.

The dimension of each portion of laminated capacitors according to the second to eighth preferred embodiments is shown in Table 1 and each value of the capacitance components C1 to C3 and the inductance components L1 to L3 of each of the first to third capacitor elements is shown in Table 2.

Moreover, in Table 1 and Table 2, in order to make the comparison with above-described first preferred embodiment easier, the values of the first preferred embodiment are also shown, and the values which are different from those in the first preferred embodiment are underlined.

TABLE 1

| Number of embodiment | Dimensions of capacitor main body | | | Length of lead-out portion | Distance between lead-out portions | Distance between terminal electrodes | Vertical length of capacitance forming portion | Horizontal length of capacitance forming portion |
|---|---|---|---|---|---|---|---|---|
| | L | W | T | A | B | C | D | E |
| 1 | 1.0 | 0.5 | 0.8 | 0.1 | 0.2 | 0.1 | 0.6 | 0.8 |
| 2 | 1.0 | 0.5 | 0.9 | 0.2 | 0.2 | 0.1 | 0.6 | 0.8 |
| 3 | 1.0 | 0.5 | 0.8 | 0.1 | 0.5 | 0.1 | 0.6 | 0.8 |
| 4 | 1.0 | 0.5 | 0.8 | 0.1 | 0.45 | 0.1 | 0.6 | 0.8 |
| 5 | 1.0 | 0.5 | 0.8 | 0.1 | 0.5 | 0.35 | 0.6 | 0.8 |
| 6 | 1.0 | 0.5 | 1.0 | 0.1 | 0.2 | 0.1 | 0.8 | 0.8 |
| 7 | 1.2 | 0.5 | 0.8 | 0.1 | 0.2 | 0.1 | 0.6 | 1.0 |
| 8 | 1.0 | 0.5 | 0.8 | 0.1 | 0.2 | 0.1 | 0.6 | 0.8 |

(Unit: mm)

TABLE 2

| Number of embodiment | First capacitor element | | Second capacitor element | | Third capacitor element | |
|---|---|---|---|---|---|---|
| | C1 | L1 | C2 | L2 | C3 | L3 |
| 1 | 220 nF | 250 pH | 11 pF | 200 pH | 40 pF | 230 pH |
| 2 | 220 nF | 600 pH | 11 pF | 200 pH | 20 pF | 230 pH |
| 3 | 220 nF | 550 pH | 11 pF | 200 pH | 60 pF | 230 pH |
| 4 | 220 nF | 500 pH | 11 pF | 200 pH | 55 pF | 230 pH |
| 5 | 220 nF | 550 pH | 8.5 pF | 400 pH | 40 pF | 230 pH |
| 6 | 220 nF | 250 pH | 11 pF | 200 pH | 40 pF | 320 pH |
| 7 | 220 nF | 250 pH | 11 pF | 200 pH | 40 pF | 270 pH |
| 8 | 220 nF | 250 pH | 11 pF | 200 pH | 35 pF | 230 pH |

Second Preferred Embodiment

Figure 5:
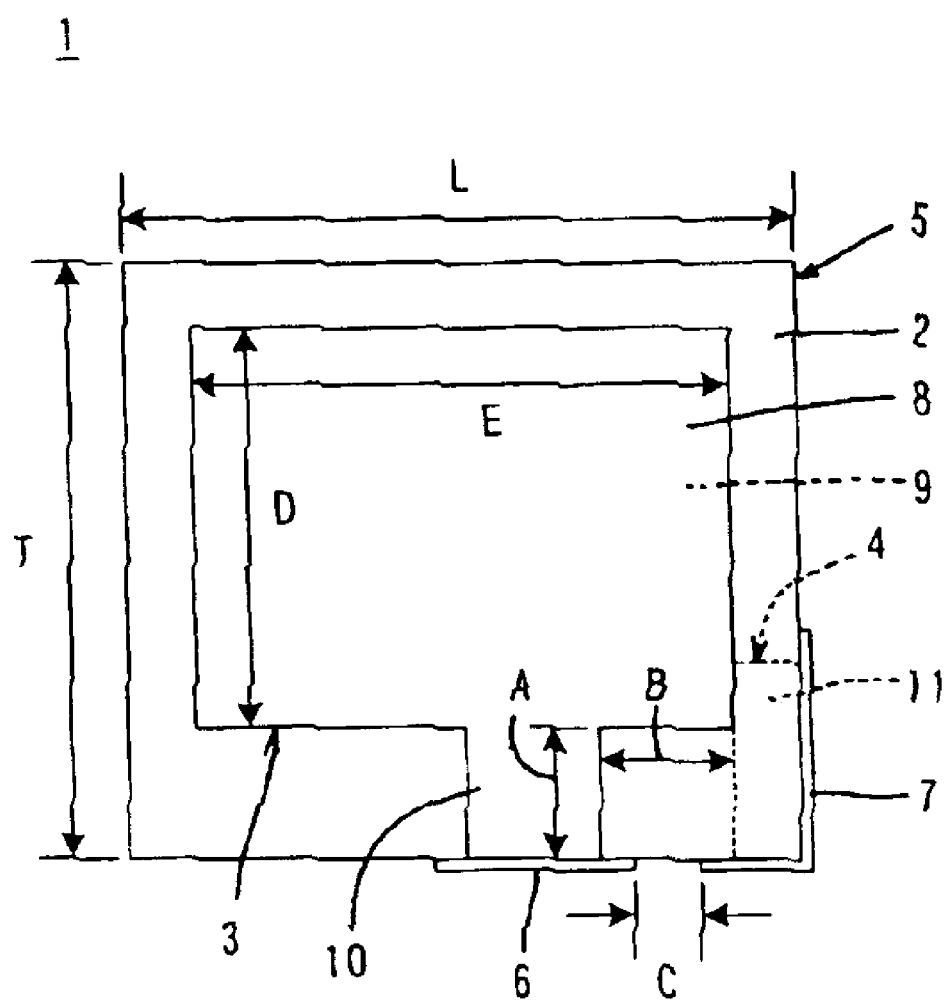
FIG. 5 is a front view of a laminated capacitor according to a second preferred embodiment of the present invention, corresponding to FIG. 1.
Figure 6:
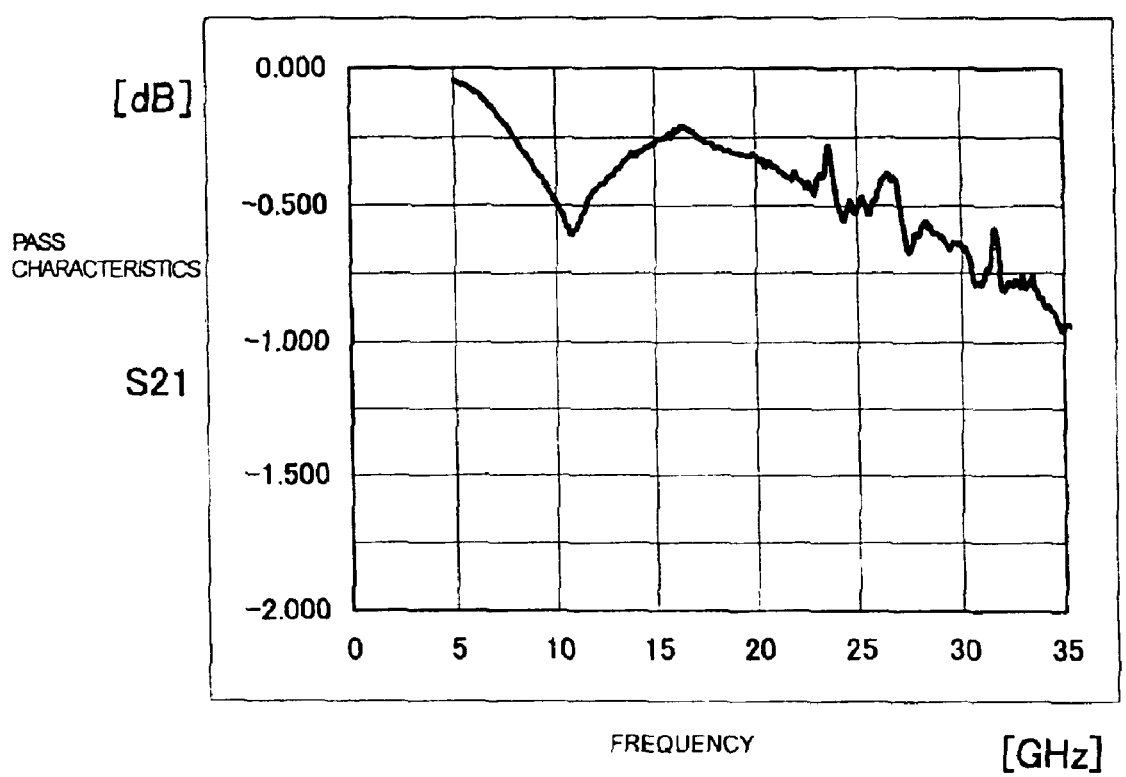
FIG. 6 shows the pass characteristics obtained in the laminated capacitor according to the second preferred embodiment, corresponding to FIG. 4.

FIGS. 5 and 6 show a laminated capacitor according to the second preferred embodiment and the figures correspond to FIGS. 1 and 4, respectively.

In the second preferred embodiment, when compared with the first preferred embodiment, as shown in Table 1, the length A of the lead-out portions 10 and 11 are lengthened to about 0.2 mm and accordingly the dimension T in the thickness direction to about the capacitor main body 5 is lengthened to about 0.9 mm, for example. The other structure of the second preferred embodiment is the same as in the first preferred embodiment.

As a result of the above dimensional change, the current pass providing the first inductance component L1 of the first capacitor is lengthened; as shown in Table 2, the value of the first inductance component L1 in crease to about 600 pH; and, as a result, as shown in FIG. 6, the loss increases in the vicinity of about 10 GHz such that S21 increases to about −0.6 dB.

Furthermore, in the third capacitor element, the distances between the set of the capacitance forming portions 8 and 9 and the terminal electrodes 6 and 7 providing the third capacitance component C3 are lengthened and the value of the third capacitance component C3 decreases to about 20 pF.

Third Preferred Embodiment

Figure 7:
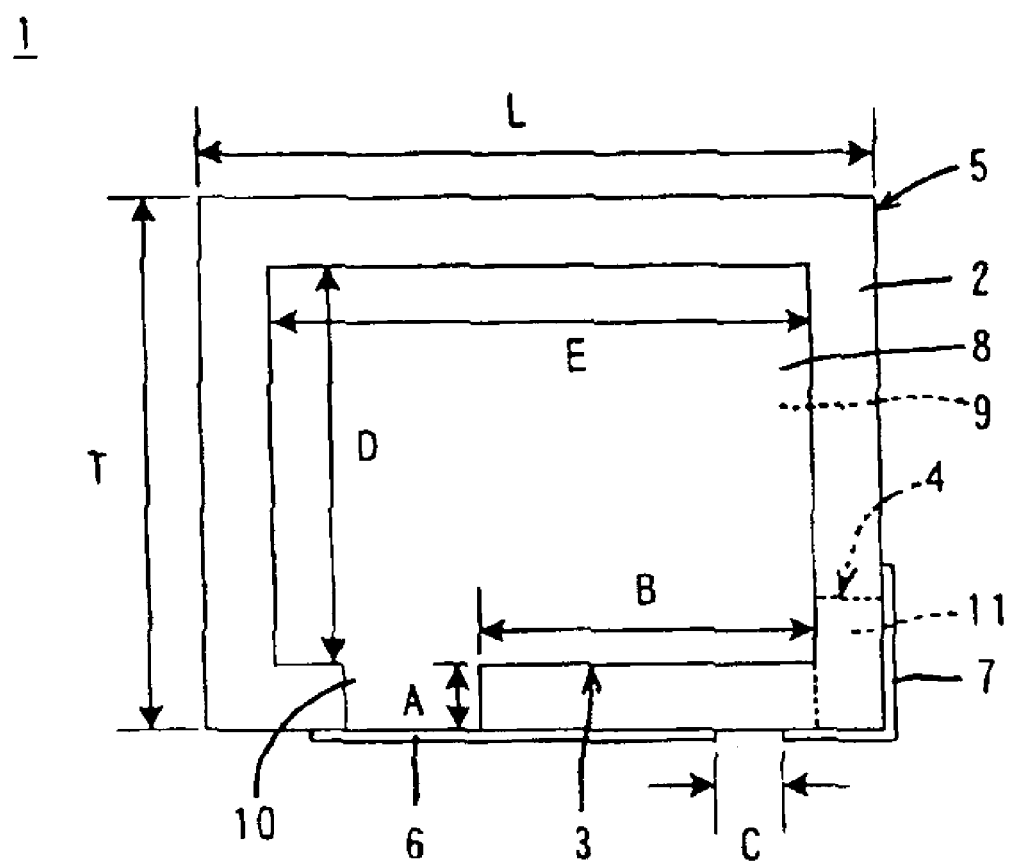
FIG. 7 is a front view of a laminated capacitor according to a third preferred embodiment of the present invention, corresponding to FIG. 1.
Figure 8:
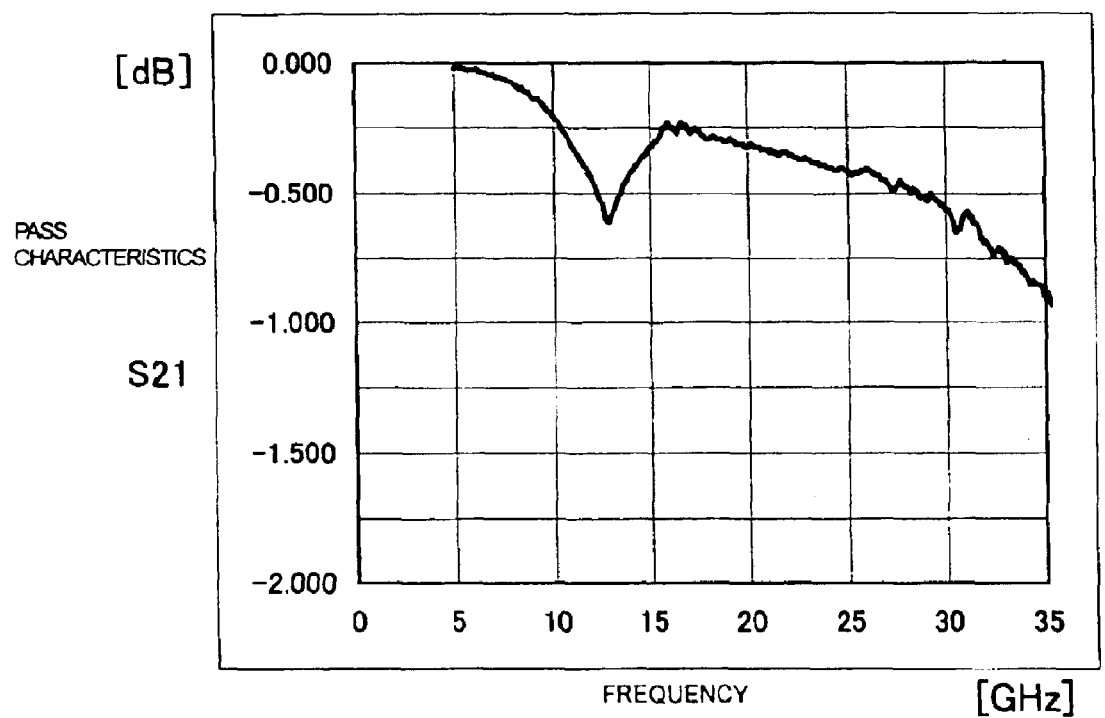
FIG. 8 shows the pass characteristics obtained in the laminated capacitor according to the third preferred embodiment of the present invention, corresponding to FIG. 4.

FIGS. 7 and 8 show a laminated capacitor according to the third preferred embodiment and the figures correspond to FIGS. 1 and 4, respectively.

In the third preferred embodiment, when compared with the first preferred embodiment, as shown in Table 1, the distance B between the lead-out portions 10 and 11 are lengthened to about 0.5 mm, for example. The other structure of the third preferred embodiment is preferably the same as in the first preferred embodiment.

As a result of the above dimensional change, the current pass between the lead-out portions 10 and 11 providing the first inductance component L1 of the first capacitor element is lengthened and, as shown in Table 2, the value of the first inductance component L1 increases to about 550 pH. Because of the effect, as shown in FIG. 8, the loss increases in the vicinity of about 12 GHz to about 13 GHz such that S21 is about −0.6 dB.

Furthermore, out of the first and second terminal electrodes 6 and 7 facing the set of capacitance forming portions 8 and 9 providing the third capacitance component C3 of the third capacitor element, the area of the first terminal electrode 6 increases and accordingly, as shown in Table 2, the value of the third capacitance component C3 increases to 60 pF. The third capacitance component C3 hardly affects the pass characteristics.

Fourth Preferred Embodiment

Figure 9:
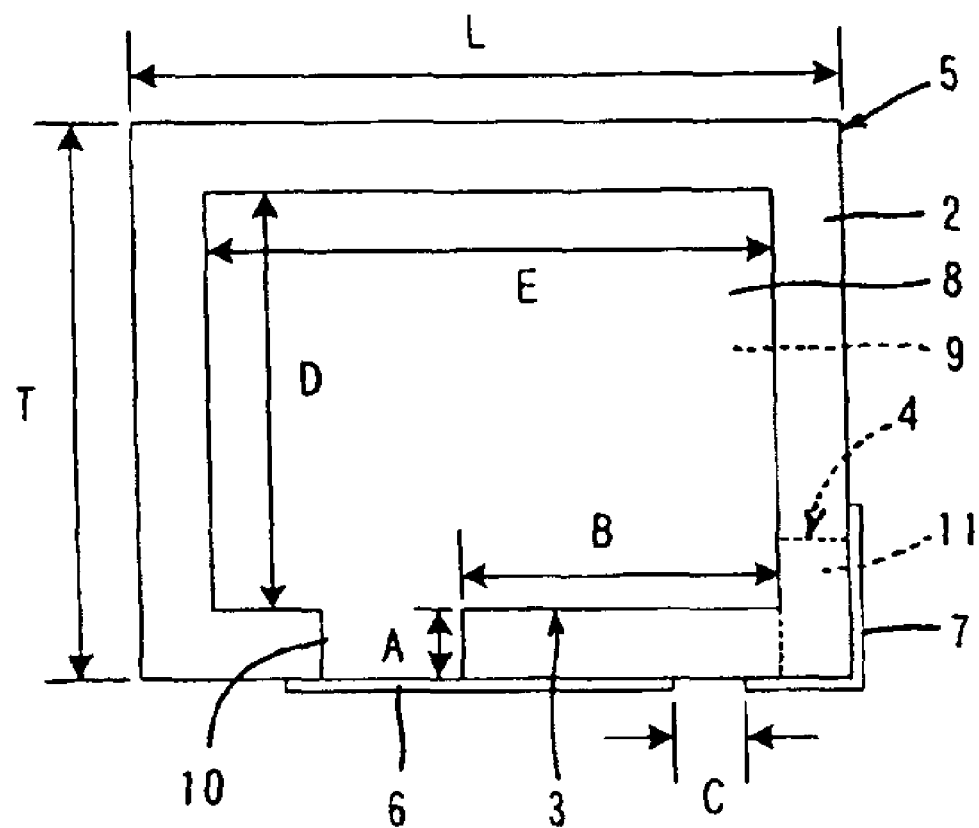
FIG. 9 is a front view of a laminated capacitor according to a fourth preferred embodiment of the present invention, corresponding to FIG. 1.
Figure 10:
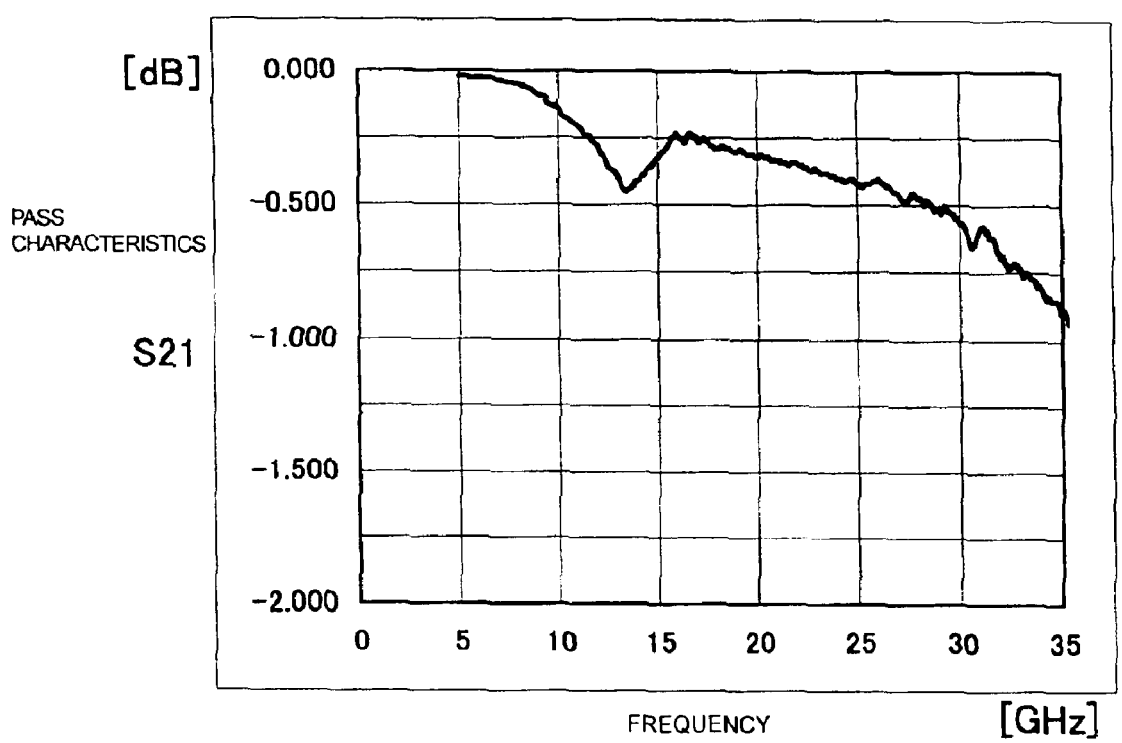
FIG. 10 shows the pass characteristics obtained in the laminated capacitor according to fourth preferred embodiment of the present invention, corresponding to FIG. 4.

FIGS. 9 and 10 show a laminated capacitor according to the fourth preferred embodiment and the figures correspond to FIGS. 1 and 4, respectively.

In the fourth preferred embodiment, as shown in Table 1, although the distance B between the lead-out portions 10 and 11 is smaller than in the third preferred embodiment, the distance B is larger than in the first preferred embodiment and set to be about 0.45 mm. The other structure in the fourth preferred embodiment is the same as in the first preferred embodiment.

Therefore, as shown in Table 2, although the first inductance component L1 of the first capacitor element is smaller than that in the third preferred embodiment, it is larger than that in the first preferred embodiment and the value of the first inductance component L1 is about 500 pH. Because of this effect, as shown in FIG. 10, although S21 decreases in the vicinity of about 13 GHz, it maintains a value of not less than about −0.5 dB. Furthermore, also in the frequency range of not less than about 15 GHz, S21 maintains a value of not less than about −1.0 dB. From these, when the value of the first inductance component L1 is not more than about 500 pH, since the loss is small, the laminated capacitor is desirable.

The third capacitance component C3 of the third capacitor element is larger than in the first preferred embodiment in the same way as in the third preferred embodiment and has a value of about 55 pF, but thus hardly affect the pass characteristics.

Fifth Preferred Embodiment

Figure 11:
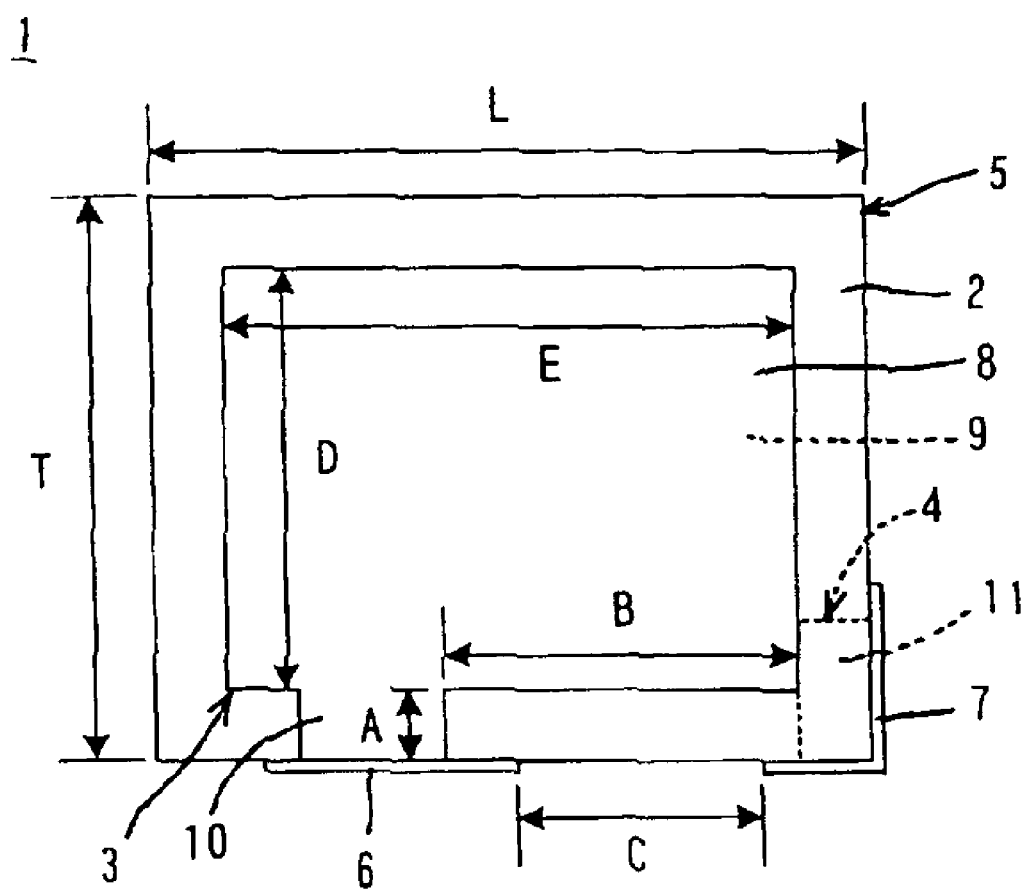
FIG. 11 is a front view of a laminated capacitor according to a fifth preferred embodiment of the present invention, corresponding to FIG. 1.
Figure 12:
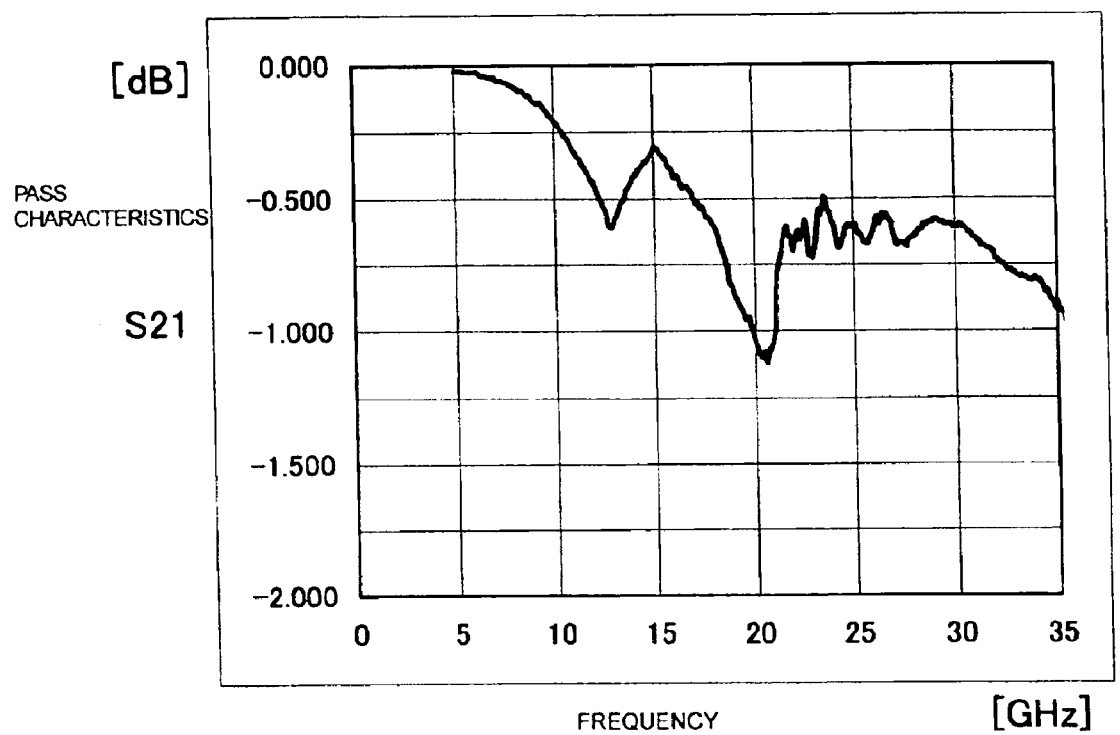
FIG. 12 shows the pass characteristics obtained in the laminated capacitor according to fifth preferred embodiment of the present invention, corresponding to FIG. 4.

FIGS. 11 and 12 show a laminated capacitor according to a fifth preferred embodiment and the figures correspond to FIGS. 1 and 4, respectively.

In the fifth preferred embodiment, when compared with the first preferred embodiment, as shown in Table 1, the distance B between the lead-out portions 10 and 11 is made as long as about 0.5 mm and also the distance C between the terminal electrodes 6 and 7 is made as long as about 0.35 mm, for example. The other structure in the fifth preferred embodiment is preferably the same as in the first preferred embodiment.

As a result of the above dimensional change, first, the current pass between the lead-out portions 10 and 11 providing the first inductance component L1 of the first capacitor element is lengthened, and, as shown in Table 2, the value of the first inductance component L1 is made as large as about 550 pH. Therefore, as shown in FIG. 12, the loss in the vicinity of about 12 GHz to about 13 GHz increases and S21 becomes about −0.6 dB.

Furthermore, since the current pass between the first and second terminal electrodes 6 and 7 providing the second inductance component L2 of the second capacitor element is lengthened, as shown in Table 2, the value of the second inductance component L2 is made as large as about 400 pH. Therefore, as shown in FIG. 12, S21 becomes about −1.1 dB in the vicinity of about 20 GHz to increase the loss.

Furthermore, since the space between the first terminal electrode 6 and the second terminal electrode 7 providing the second capacitance component C2 of the second capacitor element is widened, the value of the second capacitance component C2 decreases to about 8.5 pF.

Sixth Preferred Embodiment

Figure 13:
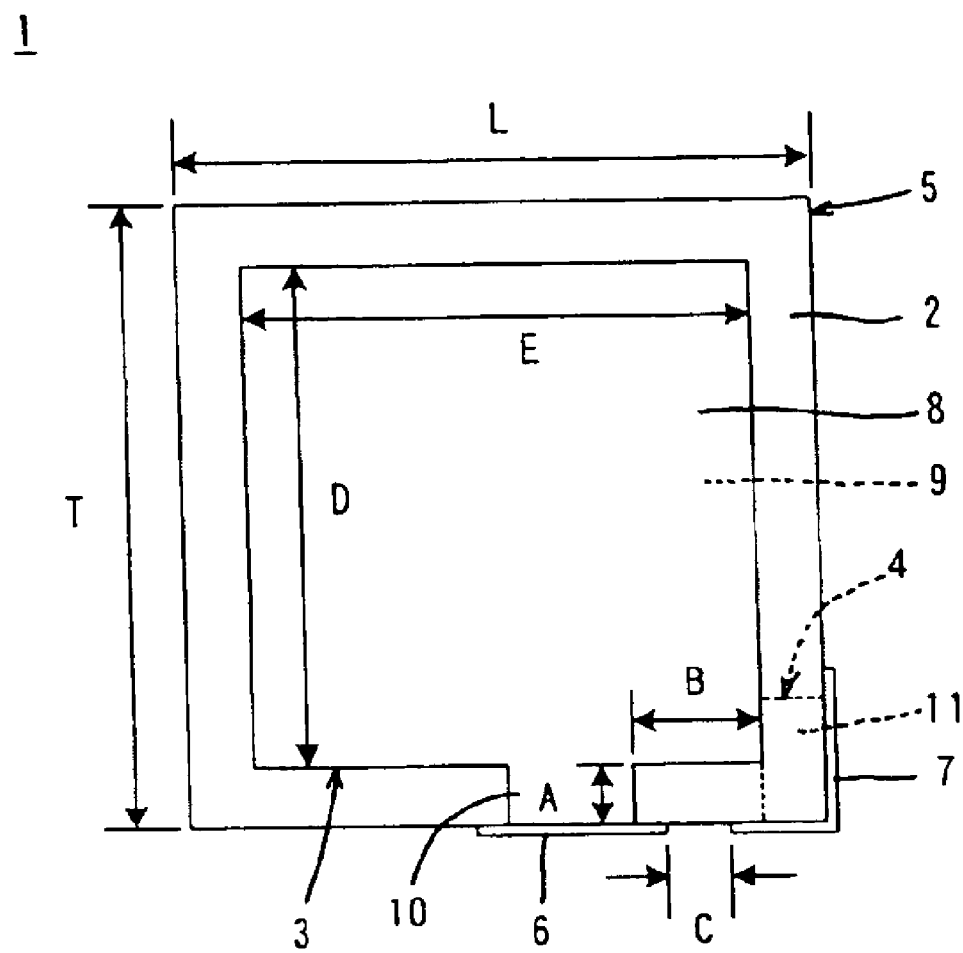
FIG. 13 is a front view of a laminated capacitor according to a sixth preferred embodiment of the present invention, corresponding to FIG. 1.
Figure 14:
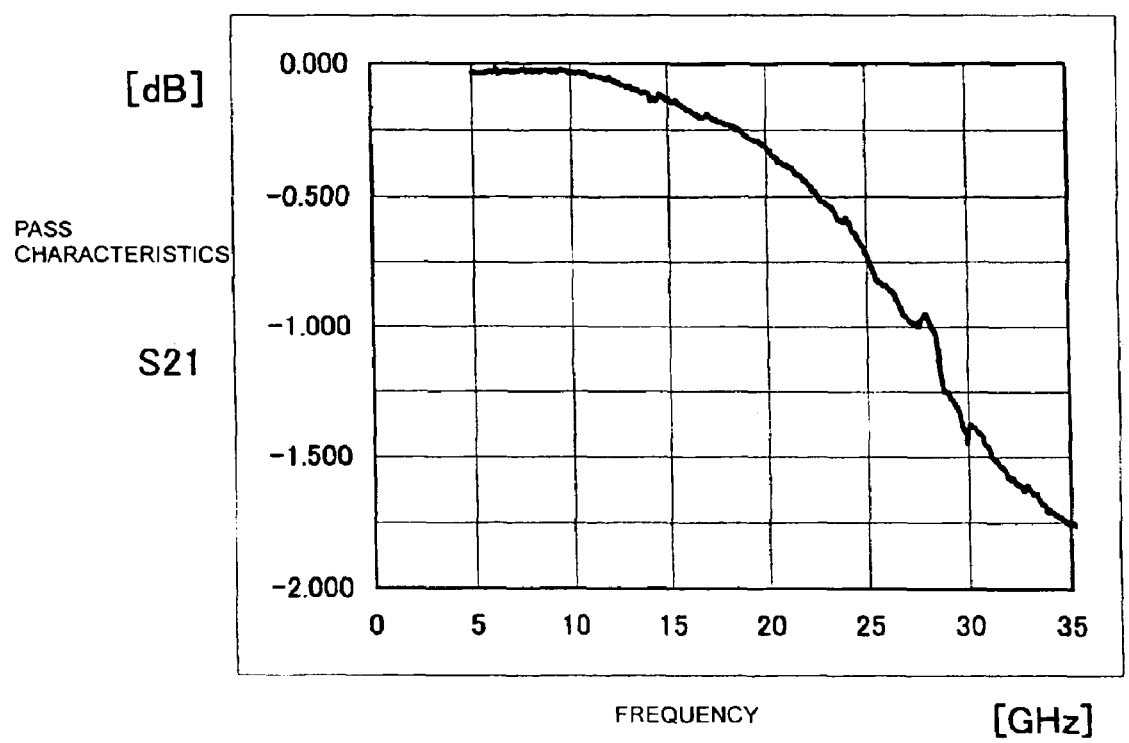
FIG. 14 shows the pass characteristics obtained in the laminated capacitor according to the sixth preferred embodiment of the present invention, corresponding to FIG. 4.

FIGS. 13 and 14 show a laminated capacitor according to the sixth preferred embodiment and the figures correspond to FIGS. 1 and 4, respectively.

In the sixth preferred embodiment, when compared with the first preferred embodiment, as shown in Table 1, the vertical length D of the capacitance forming portions 8 and 9 is made as long as about 0.8 mm and accordingly the dimension T in the thickness direction of the capacitor main body 5 is made as large as about 1.0 mm, for example. The other structure in the sixth preferred embodiment is preferably the same as in the first preferred embodiment.

As a result of the above dimensional change, the current pass around the capacitance forming portions 8 and 9 providing the third inductance component L3 of the third capacitor element is lengthened and, as shown in Table 2, the value of the third inductance component L3 increases to about 320 pH. Because of this effect, as shown in FIG. 14, the loss in the vicinity of about 35 GHz increases such that S21 is not more than about −1.7 dB.

Seventh Preferred Embodiment

Figure 15:
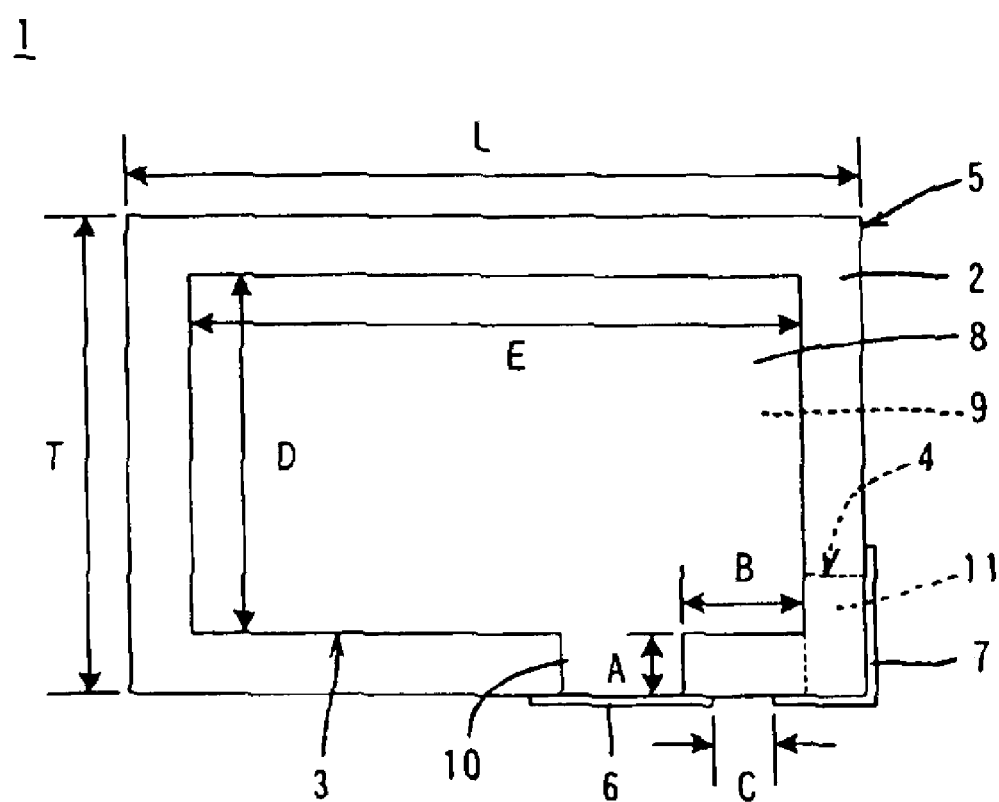
FIG. 15 is a front view of a laminated capacitor according to a seventh preferred embodiment of the present invention, corresponding to FIG. 1.
Figure 16:
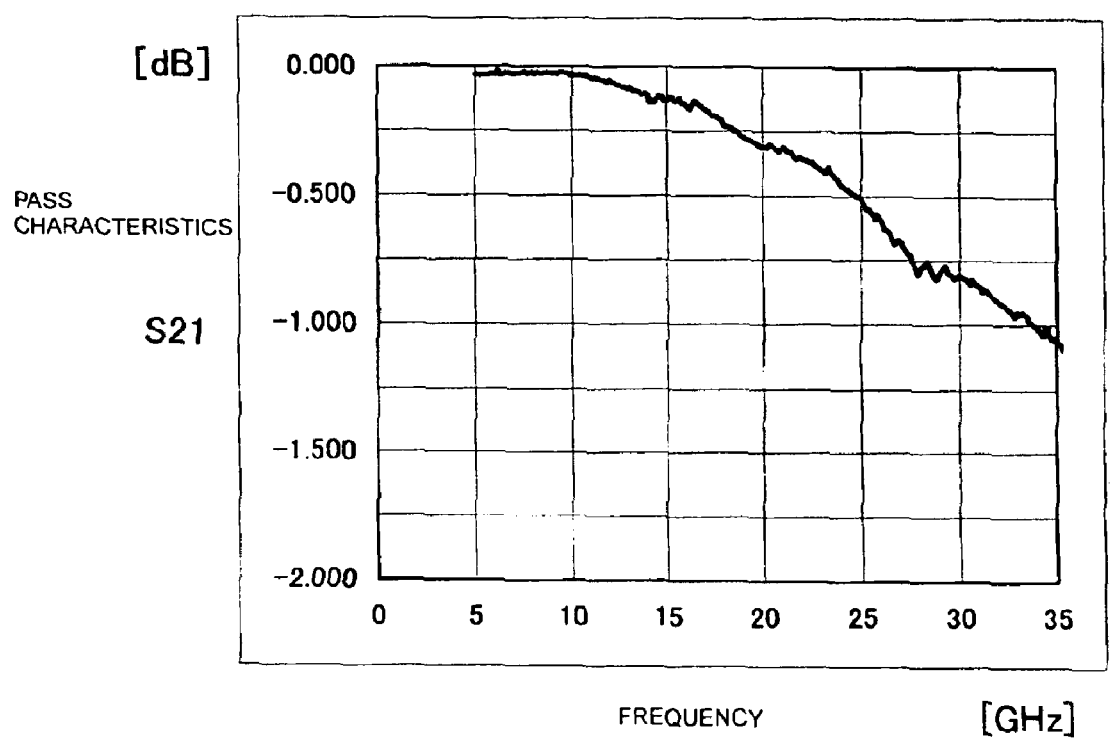
FIG. 16 shows the pass characteristics obtained in the laminated capacitor according to the seventh preferred embodiment of the present invention, corresponding to FIG. 4.

FIGS. 15 and 16 show a laminated capacitor according to a seventh preferred embodiment and the figures correspond to FIGS. 1 and 4, respectively.

In the seventh preferred embodiment, when compared with the first preferred embodiment, as shown in Table 1, the horizontal length E of the capacitance forming portions 8 and 9 is made as long as about 1.0 mm and accordingly the dimension L in the length direction of the capacitor main body 5 is as large as about 1.2 mm. The other structure of the seventh preferred embodiment is preferably the same as in the first preferred embodiment.

As a result of the above dimensional change, the current pass around the capacitance forming portions 8 and 9 providing the third inductance component L3 of the third capacitor element is lengthened and, as shown in Table 2, the value of the third inductance component L3 increases so as to be about 270 pH. Because of this effect, as shown in FIG. 16, the loss in the vicinity of about 35 GHz increases such that S21 is about −1.1 dB or less.

Eighth Preferred Embodiment

Figure 17:
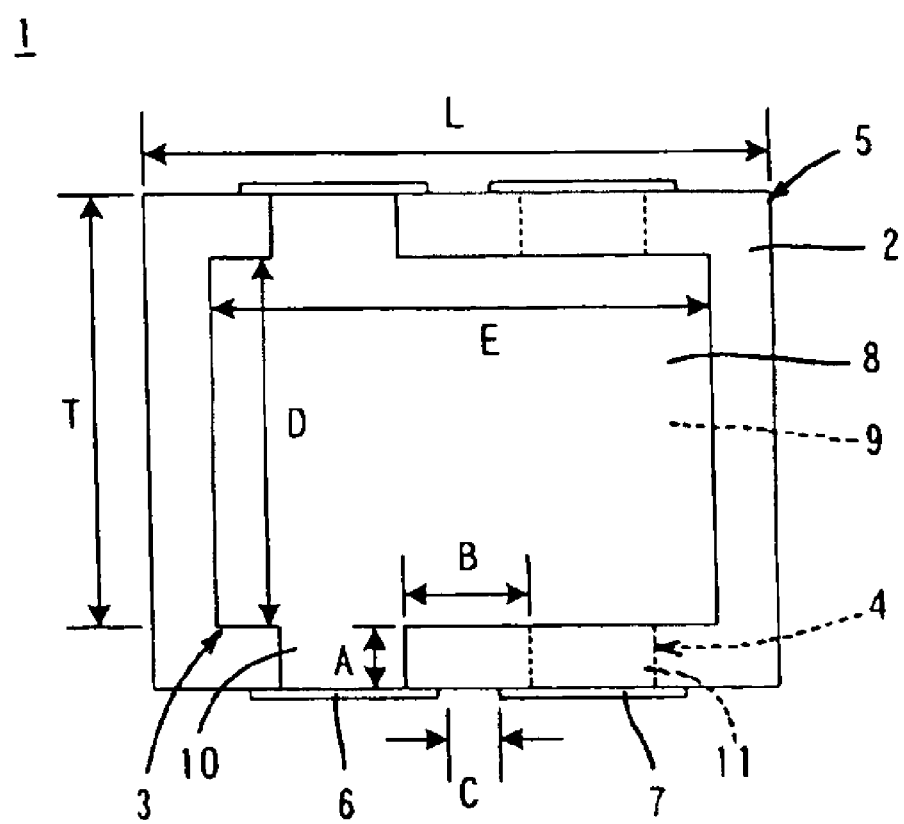
FIG. 17 is a front view of a laminated capacitor according to an eighth preferred embodiment of the present invention, corresponding to FIG. 1.
Figure 18:
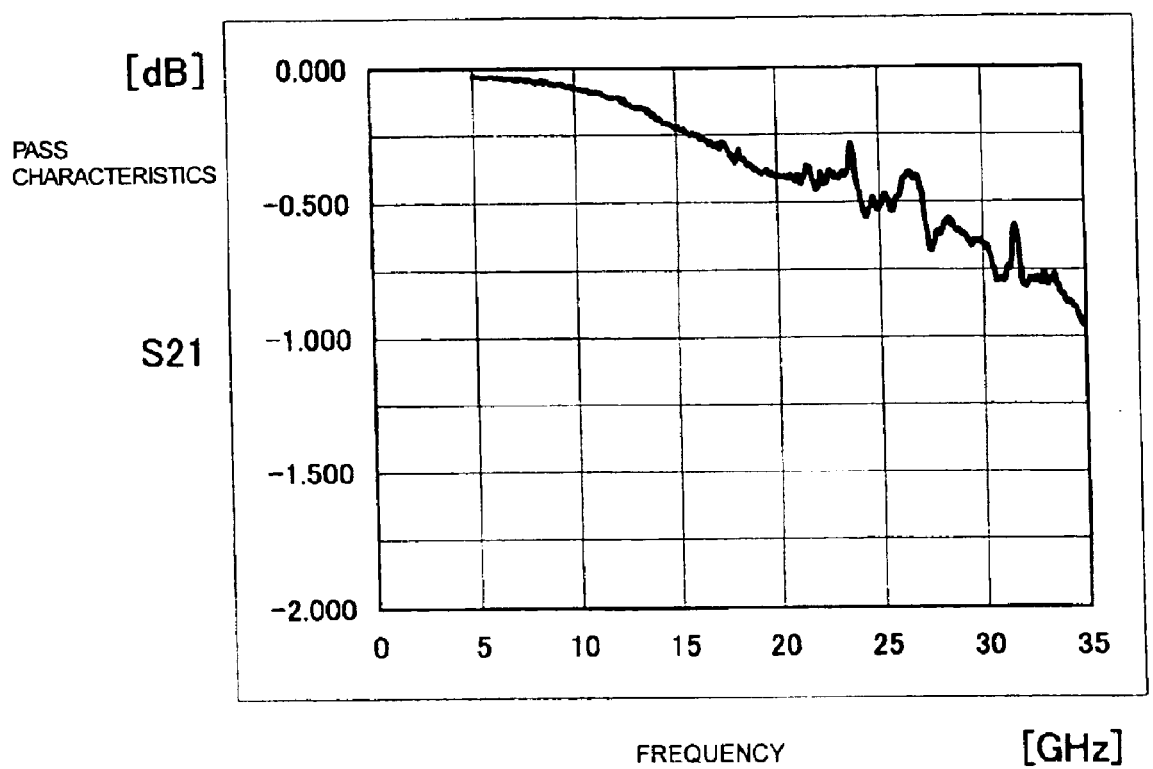
FIG. 18 shows the pass characteristics obtained in the laminated capacitor according to the eighth preferred embodiment of the present invention, corresponding to FIG. 4.
Figure 19:
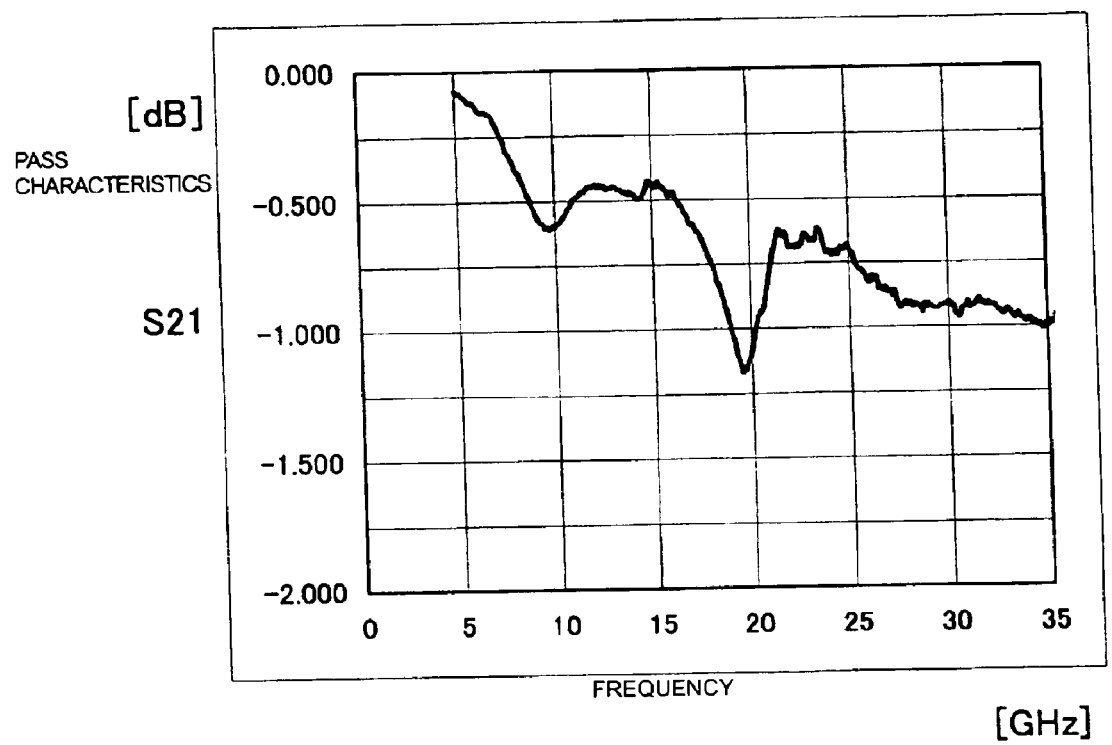
FIG. 19 shows the pass characteristics of a related laminated capacitor.

FIGS. 17 and 18 show a laminated capacitor according to the eighth preferred embodiment and the figures correspond to FIGS. 1 and 4, respectively.

In the eighth preferred embodiment, as shown in Table 1, the dimension of each portion is preferably the same as in the first preferred embodiment, but, as shown in FIG. 17, two each of the first and second lead-out portions 10 and 11 and the first and second terminal electrodes 6 and 7 are contained and the lead-out portions 10 and 11 and the terminal electrodes 6 and 7 are disposed on each of the surfaces, facing each other, of the capacitor main body 5.

The above difference from the first preferred embodiment affects the capacitance component C3 of the third capacitor element, as shown in Table 2, but the pass characteristics shown in FIG. 18 are practically the same as in the case of the first preferred embodiment shown in FIG. 4.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A laminated capacitor comprising:
   a composite capacitor including at least first, second, and third capacitor elements;
   a capacitor main body having a laminated structure including a plurality of laminated dielectric layers and pluralities of first and second internal electrodes disposed along a plurality of interfaces between the dielectric layers, the first and second internal electrodes being alternately disposed in a lamination direction;
   first and second terminal electrodes disposed on an external surface of the capacitor main body; and
   first and second capacitance forming portions facing each other through a dielectric layer and first and second lead-out portions led out from the first and second capacitance forming portions and connected to the first and second terminal electrodes, contained by the first and second internal electrodes, respectively; wherein
   the first capacitor element includes a first capacitance component and a first inductance component, the first capacitance component is provided by the first and second capacitance forming portions facing each other, the first inductance component is mainly provided by the current pass between the first and second lead-out portions in the first and second internal electrodes in the frequency range of up to about 10 GHz, and the pass characteristics in the frequency range of up to about 10 GHz are provided by the first capacitance component and the first inductance component;

the second capacitor element includes a second capacitance component and a second inductance component, the second capacitance component is provided by the first and second terminal electrodes facing each other, the second inductance component is mainly provided by the current pass between the first and second terminal electrodes in the frequency range of about 15 GHz to about 20 GHz, and the pass characteristics in the frequency range of about 15 GHz to about 20 GHz are provided by the second capacitance component and the second inductance component;

the third capacitor element includes a third capacitance component and a third inductance component, the third capacitance component is provided by a set of the pluralities of first and second capacitance forming portions and the first and second terminal electrodes facing each other, the third inductance component is mainly provided by the current pass around the first and second capacitance forming portions in the frequency range of not less than about 30 GHz, and the pass characteristics in the frequency range of not less than about 30 GHz are provided by the third capacitance component and the third inductance component; and the first inductance component has an inductance value of not more than about 500 pH at about 10 GHz and is larger than both of the inductance value of the second inductance component at about 15 GHz to about 20 GHz and the inductance value of the third inductance component at about 30 GHz.

2. A laminated capacitor as claimed in claim 1, wherein the distance between the first and second terminal electrodes is not more than about 300 μm.

3. A laminated capacitor as claimed in claim 1, wherein, in the pass band, the first and second inductance components function in the frequency range of about 10 GHz to about 15 GHz, and the second and third inductance components function in the frequency range of about 20 GHz to about 30 GHz.

4. A laminated capacitor as claimed in claim 1, wherein a length of the capacitor main body is about 1.0 mm, a thickness of the capacitor main body is about 0.8 mm, and a width of the capacitor main body is about 0.5 mm.

5. A laminated capacitor as claimed in claim 1, wherein a length of the lead-out portions is about 0.1 mm, a distance between the lead-out portions is about 0.2 mm, a distance between the terminal electrodes is about 0.1 mm, a length in a direction perpendicular to the capacitance forming portions is about 0.6 mm, and a length in a horizontal direction of the capacitance forming portions is about 0.8 mm.

6. A laminated capacitor as claimed in claim 1, wherein a length of the lead-out portions is about 0.2 mm and a thickness of the capacitor main body is about 0.9 mm and a value of the first inductance component is increased to about 600 pH.

7. A laminated capacitor as claimed in claim 1, wherein a distance between the lead-out portions is about 0.5 mm and the value of the first inductance component is increased to about 550 pH.

8. A laminated capacitor as claimed in claim 1, wherein a distance between the lead-out portions is about 0.45 mm and the value of the first inductance component is about 500 pH.

9. A laminated capacitor as claimed in claim 1, wherein a length of the lead-out portions is about 0.5 mm, a distance between the terminal electrodes is about 0.35 mm and a value of the first inductance component is increased to about 550 pH.

10. A laminated capacitor as claimed in claim 1, wherein a vertical length of the capacitance forming portions is about 0.8 mm and a thickness of the capacitor main body is about 1.0 mm.

11. A laminated capacitor as claimed in claim 1, wherein a horizontal length of the capacitance forming portions is about 1.0 mm and a length of the capacitor main body is about 1.2 mm.

12. A laminated capacitor as claimed in claim 1, wherein two each of the first and second lead-out portions and the first and second terminal electrodes are provided and the lead-out portions and the terminal electrodes are disposed on each of the surfaces, facing each other, of the capacitor main body.

13. A laminated capacitor comprising:

a composite capacitor including at least first, second, and third capacitor elements;

a capacitor main body having a laminated structure including a plurality of laminated dielectric layers and pluralities of first and second internal electrodes disposed along a plurality of interfaces between the dielectric layers, the first and second internal electrodes alternately disposed in a lamination direction;

first and second terminal electrodes disposed on an external surface of the capacitor main body; and first and second capacitance forming portions facing each other through a dielectric layer and first and second lead-out portions led out from the first and second capacitance forming portions and connected to the first and second terminal electrodes, contained by the first and second internal electrodes, respectively; wherein the first capacitor element includes a first capacitance component and a first inductance component, the first capacitance component is provided by the first and second capacitance forming portions facing each other, the first inductance component is mainly provided by the current pass between the first and second lead-out portions in the first and second internal electrodes in the frequency range of up to about 10 GHz, and the pass characteristics in the frequency range of up to about 10 GHz are provided by the first capacitance component and the first inductance component;

the second capacitor element includes a second capacitance component and a second inductance component, the second capacitance component is provided by the first and second terminal electrodes facing each other, the second inductance component is mainly provided by the current pass between the first and second terminal electrodes layer in the frequency range of about 15 GHz to about 20 GHz, and the pass characteristics in the frequency range of about 15 GHz to about 20 GHz are provided by the second capacitance component and the second inductance component;

the third capacitor element includes a third capacitance component and a third inductance component, the third capacitance component is provided by a set of the pluralities of first and second capacitance forming portions and the first and second terminal electrodes facing each other, the third inductance component is mainly provided by the current pass around the first and second capacitance forming portions in the frequency range of not less than about 30 GHz, and the pass characteristics in the frequency range of not less than about 30 GHz are provided by the third capacitance component and the third inductance component; and the distance between the first and second terminal electrodes is not more than about 300 μm.

14. A laminated capacitor as claimed in claim 13, wherein, in the pass band, the first and second inductance components function in the frequency range of about 10 GHz to about 15 GHz, and the second and third inductance components function in the frequency range of about 20 GHz to about 30 GHz.

15. A laminated capacitor as claimed in claim 13, wherein, in the pass band, the first and second inductance components function in the frequency range of about 10 GHz to about 15 GHz, and the second and third inductance components function in the frequency range of about 20 GHz to about 30 GHz.

16. A laminated capacitor as claimed in claim 13, wherein a length of the capacitor main body is about 1.0 mm, a thickness of the capacitor main body is about 0.8 mm, and a width of the capacitor main body is about 0.5 mm.

17. A laminated capacitor as claimed in claim 13, wherein a length of the lead-out portions is about 0.1 mm, a distance between the lead-out portions is about 0.2 mm, a distance between the terminal electrodes is about 0.1 mm, a length in a direction perpendicular to the capacitance forming portions is about 0.6 mm, and a length in a horizontal direction of the capacitance forming portions is about 0.8 mm.

18. A laminated capacitor as claimed in claim 13, wherein a length of the lead-out portions is about 0.2 mm and a thickness of the capacitor main body is about 0.9 mm and a value of the first inductance component is increased to about 600 pH.

19. A laminated capacitor as claimed in claim 13, wherein a distance between the lead-out portions is about 0.5 mm and the value of the first inductance component is increased to about 550 pH.

20. A laminated capacitor as claimed in claim 13, wherein a distance between the lead-out portions is about 0.45 mm and the value of the first inductance component is about 500 pH.

21. A laminated capacitor as claimed in claim 13, wherein a length of the lead-out portions is about 0.5 mm, a distance between the terminal electrodes is about 0.35 mm and a value of the first inductance component is increased to about 550 pH.

22. A laminated capacitor as claimed in claim 13, wherein a vertical length of the capacitance forming portions is about 0.8 mm and a thickness of the capacitor main body is about 1.0 mm.

23. A laminated capacitor as claimed in claim 13, wherein a horizontal length of the capacitance forming portions is about 1.0 mm and a length of the capacitor main body is about 1.2 mm.

24. A laminated capacitor as claimed in claim 13, wherein two each of the first and second lead-out portions and the first and second terminal electrodes are provided and the lead-out portions and the terminal electrodes are disposed on each of the surfaces, facing each other, of the capacitor main body.

25. A laminated capacitor comprising:

a composite capacitor including at least first, second, and third capacitor elements;

a capacitor main body having a laminated structure including a plurality of laminated dielectric layers and pluralities of first and second internal electrodes disposed along a plurality of interfaces between the dielectric layers, the first and second internal electrodes alternately disposed in a lamination direction;

first and second terminal electrodes disposed on an external surface of the capacitor main body; and first and second capacitance forming portions facing each other through a dielectric layer and first and second lead-out portions led out from the first and second capacitance forming portions and connected to the first and second terminal electrodes, contained by the first and second internal electrodes, respectively; wherein the first capacitor element includes a first capacitance component and a first inductance component, the first capacitance component is provided by the first and second capacitance forming portions facing each other, the first inductance component is mainly provided by the current pass between the first and second lead-out portions in the first and second internal electrodes in the frequency range of up to about 10 GHz, and the pass characteristics in the frequency range of up to about 10 GHz are provided by the first capacitance component and the first inductance component;

the second capacitor element includes a second capacitance component and a second inductance component, the second capacitance component is provided by the first and second terminal electrodes facing each other, the second inductance component is mainly provided by the current pass between the first and second terminal electrodes in the frequency range of about 15 GHz to about 20 GHz, and the pass characteristics in the frequency range of about 15 GHz to about 20 GHz are provided by the second capacitance component and the second inductance component;

the third capacitor element includes a third capacitance component and a third inductance component, the third capacitance component is provided by a set of the pluralities of first and second capacitance forming portions and the first and second terminal electrodes facing each other, the third inductance component is mainly provided by the current pass around the first and second capacitance forming portions in the frequency range of not less than about 30 GHz, and the pass characteristics in the frequency range of not less than about 30 GHz are provided by the third capacitance component and the third inductance component; and the pass band is provided by a combination of the first to third pass characteristics, the pass characteristics are not less than about −0.5 dB in the frequency range of up to about 15 GHz, and the pass characteristics are not less than about −1.0 dB in the frequency range of not lower about than 15 GHz.

26. A laminated capacitor as claimed in claim 25, wherein the first inductance component has an inductance value of not more than about 500 pH at about 10 GHz and is larger than both of the inductance value of the second inductance component at about 15 GHz to about 20 GHz and the inductance value of the third inductance component at about 30 GHz.

27. A laminated capacitor as claimed in claim 25, wherein the distance between the first and second terminal electrodes is not more than about 300 μm.

28. A laminated capacitor as claimed in claim 25, wherein, in the pass band, the first and second inductance components function in the frequency range of about 10 GHz to about 15 GHz, and the second and third inductance components function in the frequency range of about 20 GHz to about 30 GHz.

29. A laminated capacitor as claimed in claim 25, wherein, in the pass band, the first and second inductance components function in the frequency range of about 10 GHz to about 15 GHz, and the second and third inductance components function in the frequency range of about 20 GHz to about 30 GHz.

30. A laminated capacitor as claimed in claim 25, wherein a length of the capacitor main body is about 1.0 mm, a thickness of the capacitor main body is about 0.8 mm, and a width of the capacitor main body is about 0.5 mm.

31. A laminated capacitor as claimed in claim 25, wherein a length of the lead-out portions is about 0.1 mm, a distance between the lead-out portions is about 0.2 mm, a distance between the terminal electrodes is about 0.1 mm, a length in a direction perpendicular to the capacitance forming portions is about 0.6 mm, and a length in a horizontal direction of the capacitance forming portions is about 0.8 mm.

32. A laminated capacitor as claimed in claim 25, wherein a length of the lead-out portions is about 0.2 mm and a thickness of the capacitor main body is about 0.9 mm and a value of the first inductance component is increased to about 600 pH.

33. A laminated capacitor as claimed in claim 25, wherein a distance between the lead-out portions is about 0.5 mm and the value of the first inductance component is increased to about 550 pH.

34. A laminated capacitor as claimed in claim 25, wherein a distance between the lead-out portions is about 0.45 mm and the value of the first inductance component is about 500 pH.

35. A laminated capacitor as claimed in claim 25, wherein a length of the lead-out portions is about 0.5 mm, a distance between the terminal electrodes is about 0.35 mm and a value of the first inductance component is increased to about 550 pH.

36. A laminated capacitor as claimed in claim 25, wherein a vertical length of the capacitance forming portions is about 0.8 mm and a thickness of the capacitor main body is about 1.0 mm.

37. A laminated capacitor as claimed in claim 25, wherein a horizontal length of the capacitance forming portions is about 1.0 mm and a length of the capacitor main body is about 1.2 mm.

38. A laminated capacitor as claimed in claim 25, wherein two each of the first and second lead-out portions and the first and second terminal electrodes are provided and the lead-out portions and the terminal electrodes are disposed on each of the surfaces, facing each other, of the capacitor main body.

* * * * *